US012749689B2

(12) United States Patent
Nakanishi et al.

(10) Patent No.: US 12,749,689 B2
(45) Date of Patent: Sep. 29, 2026

(54) RESIN CURRENT COLLECTOR AND LAMINATED BATTERY

(71) Applicant: TOYOTA JIDOSHA KABUSHIKI KAISHA, Toyota (JP)

(72) Inventors: Shinji Nakanishi, Toyota (JP); Takuya Matsuyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 566 days.

(21) Appl. No.: 18/225,343

(22) Filed: Jul. 24, 2023

(65) Prior Publication Data

US 2024/0079601 A1 Mar. 7, 2024

(30) Foreign Application Priority Data

Sep. 6, 2022 (JP) ................................ 2022-141630

(51) Int. Cl.
*H01M 4/66* (2006.01)
*H01M 10/0562* (2010.01)
*H01M 50/131* (2021.01)

(52) U.S. Cl.
CPC ........ *H01M 4/668* (2013.01); *H01M 10/0562* (2013.01); *H01M 50/131* (2021.01)

(58) Field of Classification Search
CPC .. H01M 4/668; H01M 10/0562; H01M 4/667; H01M 10/0525; H01M 10/0585
See application file for complete search history.

(56) References Cited

U.S. PATENT DOCUMENTS

2006/0098382 A1 5/2006 Miyagawa et al.
2008/0118830 A1 5/2008 Lee et al.
2012/0189912 A1 7/2012 Honda et al.
2018/0090766 A1 3/2018 Ohsawa et al.
2021/0028436 A1* 1/2021 Tanaka ................ H01M 4/0404
2023/0116728 A1* 4/2023 Hotta .................... H01M 4/667
429/234

FOREIGN PATENT DOCUMENTS

JP 2008-130548 A 6/2008
JP 2010-170833 A 8/2010
JP 2012-038426 A 2/2012
JP 2012-059418 A 3/2012
JP 2012-248430 A 12/2012
JP 2016-186917 A 10/2016
JP 2020-087922 A 6/2020
WO 2004/001772 A1 12/2003
WO 2011/092938 A1 8/2011
WO 2014/007215 A1 1/2014

* cited by examiner

*Primary Examiner* — Stewart A Fraser
(74) *Attorney, Agent, or Firm* — Dinsmore & Shohl LLP

(57) ABSTRACT

The resin current collector of the present disclosure includes a base material resin, a conductive resin layer including a conductive filler dispersed in the base material resin, and a fluorine-based resin layer laminated on the conductive resin layer. Further, in the use of the resin current collector in the laminated battery, the current collector of at least one end face of the laminated battery is the resin current collector of the present disclosure, and the conductive resin layer is in contact with the other layer constituting the laminated battery, and the fluorine-based resin layer is disposed so as to face the opposite side to the other layer constituting the laminated battery.

19 Claims, 2 Drawing Sheets

RESIN CURRENT COLLECTOR AND LAMINATED BATTERY

CROSS-REFERENCE TO RELATED APPLICATION

This application claims priority to Japanese Patent Application No. 2022-141630 filed on Sep. 6, 2022 incorporated herein by reference in its entirety.

BACKGROUND

1. Technical Field

The present disclosure relates to a resin current collector and a laminated battery including the resin current collector. In particular, the present disclosure relates to a sulfide solid-state laminated battery including a resin current collector.

2. Description of Related Art

In recent years, it has been proposed to use a resin current collector for a laminated battery (Japanese Unexamined Patent Application Publication No. 2012-038426 (JP 2012-038426 A) and Japanese Unexamined Patent Application Publication No. 2020-087922 (JP 2020-087922 A)).

For example, JP 2020-087922 A discloses an all-solid-state lithium ion secondary battery including a solid electrolyte, a positive electrode, and a negative electrode, and the positive electrode and the negative electrode each includes a resin current collector. In the all-solid-state lithium-ion secondary battery above, the resin current collector includes a base material composed of a polymer material, a conductive filler, and a dispersant.

SUMMARY

Although the resin current collector has advantages in terms of lightness, processability, and the like, the inventors of the present disclosure have found that a lower gas barrier property becomes a problem depending on the application used, in comparison with a metal current collector such as an aluminum foil, a stainless steel foil, or a copper foil.

In contrast, an object of the present disclosure is to solve the above problem while taking advantage of benefits of a resin current collector such as lightness and processability.

The present inventors have found that the above problem can be solved by the following, and have completed the present disclosure. That is, the present disclosure is as described below.

First Aspect

A resin current collector includes: a conductive resin layer containing a base material resin and a conductive filler dispersed in the base material resin; and a fluorine-based resin layer laminated on the conductive resin layer.

Second Aspect

In a laminated battery including one or more unit batteries, a current collector on at least one end surface of the laminated battery is the resin current collector according to the first aspect, and the conductive resin layer of the resin current collector is in contact with another layer constituting the laminated battery, and the fluorine-based resin layer of the resin current collector is disposed so as to face opposite to the other layer constituting the laminated battery.

Third Aspect

In the laminated battery according to the second aspect, at least one of a positive electrode layer, a solid electrolyte layer, a negative electrode layer constituting the unit battery contains a sulfide solid electrolyte.

The present disclosure provides a resin current collector having improved gas barrier properties while taking advantage of the benefits of the resin current collector such as lightness and processability, and also provides a laminated battery including such a resin current collector.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
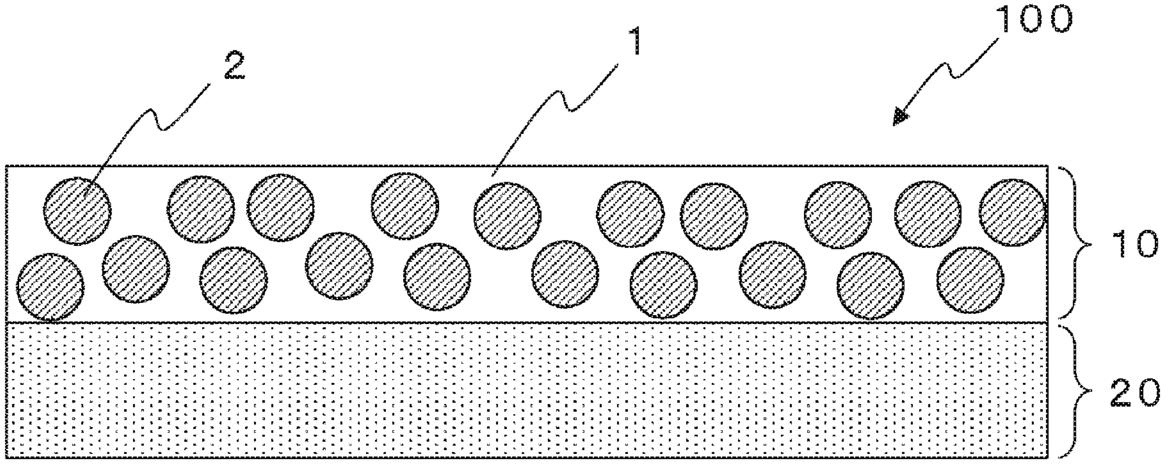
FIG. 1 is a cross-sectional view showing an example of a resin current collector of the present disclosure.

Hereinafter, embodiments of the present disclosure will be described in detail with reference to the drawings. However, the embodiments shown in the drawings are examples of the present disclosure. The form shown in the figures is not intended to limit the disclosure.

Resin Current Collector

The resin current collector of the present disclosure includes a base material resin and a conductive resin layer including a conductive filler dispersed in the base material resin, and a fluorine-based resin layer laminated on the conductive resin layer.

According to the resin current collector of the present disclosure, in the laminated battery having one or more unit batteries, the current collector of at least one end face of the laminated battery is the resin current collector of the present disclosure, and the conductive resin layer of the resin current collector of the present disclosure is in contact with the other layer constituting the laminated battery, and the fluorine-based resin layer of the resin current collector of the present disclosure is disposed so as to face the opposite side to the other layer constituting the laminated battery, thereby providing an improved gas barrier property by the fluorine-based resin layer while taking advantage of the merits of the resin current collector such as lightness and processability. Thereby, durability can be provided to the laminated battery.

Figure 3:
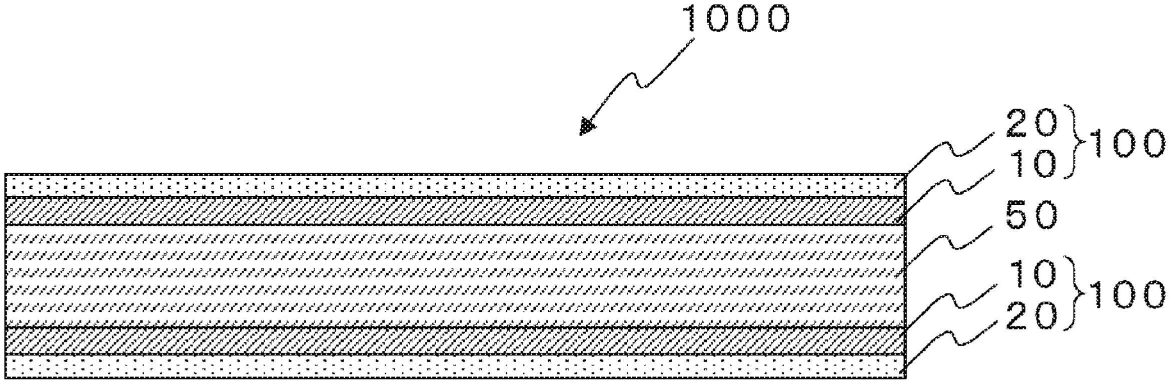
FIG. 3 is a cross-sectional view illustrating an example of a laminated battery of the present disclosure.

Specifically, for example, as shown in FIG. 1, a resin current collector 100 of the present disclosure includes a base material resin 1, a conductive resin layer 10 including a conductive filler 2 dispersed in the base material resin 1, and a fluorine-based resin layer 20 laminated on the conductive resin layer 10. Further, in the use of the resin current collector of the present disclosure, as shown in FIG. 3, in the laminated battery 1000 having one or a plurality of unit batteries, the current collector of at least one end face of the laminated battery 1000 is the resin current collector 100 of the present disclosure. In addition, the conductive resin layer 10 of the resin current collector 100 of the present disclosure is in contact with the other layers 50 constituting the laminated battery 1000. Further, the fluorine-based resin layer 20 of the resin current collector 100 of the present disclosure is disposed so as to face the side opposite to the other layer 50 constituting the laminated battery 1000. In such a laminated battery, the fluorine-based resin layer of the resin current collector provides gas barrier properties, whereby the laminated battery can have durability.

Figure 2:
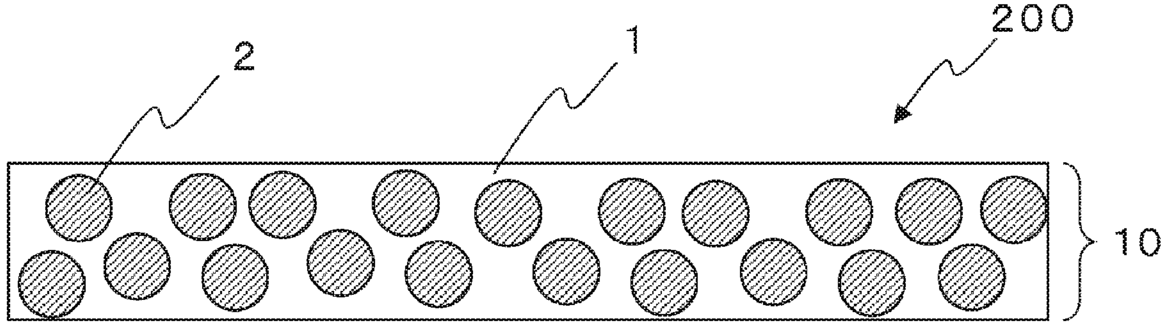
FIG. 2 Prior Art
FIG. 2 is a cross-sectional view showing an example of a conventional resin current collector.

On the other hand, as shown in FIG. 2, the conventional resin current collector 200 does not have a fluorine-based resin layer such as the resin current collector of the present disclosure. The conventional resin current collector 200 includes only the base material resin 1 and the conductive resin layer 10 including the conductive filler 2 dispersed in the base material resin 1. Accordingly, the inventors of the present disclosure have found that such a conventional resin current collector has insufficient gas barrier properties, and thus the durability of a laminated battery obtained by using such a resin current collector is inferior.

Conductive Resin Layer

The conductive resin layer constituting the resin current collector of the present disclosure includes a base material resin and a conductive filler dispersed in the base material resin. The resin current collector layer may be any conductive layer known for resin current collectors. For example, for the resin current collector layer, the description of JP 2012-038426 A and JP 2020-087922 A can be referred to. The conductive resin layer may be a single layer or a laminate of two or more conductive resin sub-layers.

Examples of the base material resin include any thermoplastic resin and thermosetting resin. The base material resin may be, for example, polyethylene (PE), polypropylene (PP), polymethyl pentene (PMP), polycycloolefin (PCO), polyethylene terephthalate (PET), polyether nitrile (PEN), polytetrafluoroethylene (PTFE), styrene butadiene rubber (SBR), polyacrylonitrile (PAN), polymethyl acrylate (PMA), polymethyl methacrylate (PMMA), polyvinylidene fluoride (PVdF), epoxy resin, silicone resin, or mixtures thereof. In some embodiments, from the viewpoint of electrostability, the base material resin is polyethylenes (PE), polypropylenes (PP), polymethylpentenes (PMP), and polycycloolefins (PCO). In some embodiments, the base material resin is polyethylene (PE), polypropylene (PP), or polymethylpentene (PMP), or mixtures thereof.

The conductive filler can be selected from any material having conductivity. In some embodiments, from the viewpoint of suppressing ion permeation in the current collector, the conductive filler is a material having no conductivity with respect to ions used as a charge transfer medium. Specifically, the conductive filler may be a carbon material, aluminum, gold, silver, copper, iron, platinum, chromium, tin, indium, antimony, titanium, nickel, or the like. However, the conductive filler is not limited thereto. These conductive fillers may be used alone or in combination of two or more thereof. As the conductive filler, an alloyed material such as SUS may be used. In some embodiments, from the viewpoint of corrosion resistance, the conductive filler is aluminum, stainless steel, carbon material, nickel. These conductive fillers may be formed by coating the metal described above with plating or the like around a ceramic material or a resin material.

The conductive resin layer may optionally further contain a dispersant for dispersing the conductive filler in the base material resin in addition to the base material resin and the conductive filler. The conductive resin layer may optionally contain other components such as a colorant, an ultraviolet absorber, and a plasticizer. The total amount of the components other than the base material resins and the conductive filler may be 0.001 parts by weight or more, 0.01 parts by weight or more, 0.1 part by weight or more, and 1 part by weight or more, of 100 parts by weight of the conductive resin layer. The total addition amount of the components other than the base material resin and the conductive filler may be 20 parts by weight or less, 15 parts by weight or less, 10 parts by weight or less, 5 parts by weight or less, or 3 parts by weight or less in 100 parts by weight of the conductive resin layer.

Fluorine-Based Resin Layer

In the resin current collector of the present disclosure, the fluorine-based resin layer is laminated on the conductive resin layer. In the resin current collector of the present disclosure, since the fluorine-based resin has a relatively high gas barrier property, when the resin current collector of the present disclosure is used as a current collector of an end face of a laminated battery, it is possible to suppress the surrounding gas from reaching the battery stack through the resin current collector layer of the present disclosure.

The proportion of the fluorine-based resin in the fluorine-based resin layer may be more than 50% by mass, 60% by mass or more, 70% by mass or more, 80% by mass or more, 90% by mass or more, 95% by mass or more, or 99% by mass or more. As a component other than the fluorine-based resin in the fluorine-based resin layer, any other resin such as the resin mentioned with respect to the base material resin of the conductive resin layer, a colorant, an ultraviolet absorber, a plasticizer, and the like can be used. As components other than the fluorine-based resin in the fluorine-based resin layer, conductive fillers such as those mentioned for the conductive fillers of the conductive resin layer, and insulating fillers such as oxides, nitrides, carbides, carbonates, or sulfates can be used.

The fluorine-based resin may be any resin having a fluorine atom (F) in the structural unit (repeating unit).

Such fluororesins may be, for example, polyvinylidene fluoride (PVdF), polytetrafluoroethylene (PTFE), vinylidene fluoride-hexafluoropropylene copolymer (PVdF-HFP), fluoropolyether (FPE), perfluoropolyether (PFPE), perfluoroalkoxyalkane (PFA), perfluoroethylene propene copolymer (FEP), ethylene-tetrafluoroethylene copolymer (ETFE), polychlorotrifluoroethylene (PCTFE), ethylene chlorotrifluoroethylene copolymer (ECTFE), tetrafluoroethylene-perfluorodioxole copolymer (TFE/PDD), polyvinyl fluoride (PVF), and the like.

For example, the fluorine-based resin layer may have an acceleration such as water vapor smaller than that of the conductive resin layer when the water vapor permeation test is performed as described below.

Test methods: Compliant with JISK7129-4 (differential pressure method)

Detector: Gas Chromatograph

Test gas: Water vapor (humidified atmosphere)

Temperature and humidity: 40±2° C., 90±5% (relative humidity)

Differential pressure: 1 atm

Laminated Battery

The laminated battery of the present disclosure is a laminated battery having one or a plurality of unit batteries. Here, in the laminated battery, the current collector of at least one end face of the laminated battery is the resin current collector of the present disclosure, and the conductive resin layer of the resin current collector is in contact with the other layer constituting the laminated battery, and the fluorine-based resin layer of the resin current collector is disposed so as to face the opposite side to the other layer constituting the laminated battery.

That is, as shown in FIG. 3, for example, the laminated battery 1000 having one or a plurality of unit batteries, and the current collector on at least one end face of the laminated battery 1000 is the resin current collector 100 of the present disclosure. In addition, the conductive resin layer 10 of the resin current collector 100 of the present disclosure is in contact with the other layers 50 constituting the laminated battery 1000. Further, the fluorine-based resin layer 20 of the resin current collector 100 of the present disclosure is disposed so as to face the side opposite to the other layer 50 constituting the laminated battery 1000. Such a laminated battery can have durability by providing the fluorine-based resin layer with gas barrier properties. The laminated battery of the present disclosure may be further packaged with a laminate film as an exterior, for example, an aluminum laminate film.

The one or more unit batteries constituting the laminated battery of the present disclosure may be any battery. Examples of the unit battery include a lithium ion battery, a sodium ion battery, a magnesium ion battery, and a calcium ion battery. In some embodiments, the unit battery is a lithium ion battery and a sodium ion battery. In some embodiments, the battery unit is a lithium ion battery.

When the unit battery is a sulfide solid battery, that is, a solid battery in which at least one of the positive electrode layer, the solid electrolyte layer, and the negative electrode layer constituting the unit battery contains a sulfide solid electrolyte, the sulfide solid electrolyte easily reacts with moisture. Therefore, in an environment in which moisture is present, the performance of the unit battery is relatively easily deteriorated.

In contrast, the resin current collector of the present disclosure can provide improved gas barrier properties by the fluorine-based resin layer. Therefore, the resin current collector of the present disclosure can be used particularly well when combined with a sulfide solid state battery.

In some embodiments, the laminated battery of the present disclosure is a solid state battery in which at least one of the positive electrode layer, the solid electrolyte layer, and the negative electrode layer constituting the unit battery contains a sulfide solid electrolyte. The unit battery may be a lithium ion sulfide solid battery, a sodium ion sulfide solid battery, a magnesium ion sulfide solid battery, a calcium ion sulfide solid battery, or the like. In some embodiments, the unit battery is a lithium ion sulfide solid battery and a sodium ion sulfide solid battery. In some embodiments, the battery unit is a lithium ion sulfide solid battery.

Note that the sulfide solid-state laminated battery of the present disclosure may be a primary battery or a secondary battery. In some embodiments, the sulfide solid laminated battery of the present disclosure is a secondary battery. This is because the secondary battery can be repeatedly charged and discharged, and is useful, for example, as an in-vehicle battery. In some embodiments, the sulfide solid laminated battery of the present disclosure is a lithium ion sulfide solid secondary battery.

In the laminated battery of the present disclosure, the unit battery is formed by laminating a positive electrode layer, a solid electrolyte layer, and a negative electrode layer in this order. The positive electrode layer may include a positive electrode current collector layer and a positive electrode active material layer. The negative electrode layer may include a negative electrode active material layer and a negative electrode current collector layer.

The laminated battery of the present disclosure may be a monopolar battery stack or a bipolar battery stack.

Monopolar Battery Stack

When the battery stack is a monopolar battery stack, the two unit batteries adjacent to each other in the stacking direction may have a monopolar configuration sharing the positive electrode current collector layer or the negative electrode current collector layer.

Thus, for example, the battery stack may be a stack of two unit batteries sharing a negative electrode current collector layer. Specifically, the battery stack may include a positive electrode current collector layer, a positive electrode active material layer, a solid electrolyte layer, a negative electrode active material layer, a negative electrode current collector layer, a negative electrode active material layer, a solid electrolyte layer, a positive electrode active material layer, and a positive electrode current collector layer in this order.

Bipolar Battery Stack

When the battery stack is a bipolar battery stack, the two unit batteries adjacent to each other in the stacking direction may have a bipolar configuration that shares a positive electrode/negative electrode current collector layer used as both the positive electrode and the negative electrode current collector layer.

Thus, for example, the battery stack may be a stack of three unit batteries that share a positive/negative current collector layer used as both a positive electrode and a negative current collector layer. Specifically, the battery stack may include a positive electrode current collector layer, a positive electrode active material layer, a solid electrolyte layer, a negative electrode active material layer, a positive electrode/negative electrode current collector layer, a positive electrode active material layer, a solid electrolyte layer, a negative electrode active material layer, a negative electrode active material layer, a positive electrode/negative electrode current collector layer, a positive electrode active material layer, a solid electrolyte layer, a negative electrode active material layer, and a negative electrode current collector layer in this order. Further, in this case, since the "positive electrode/negative electrode current collector layer" is used as both the positive electrode and the negative electrode current collector layer, it applies to both the "positive electrode current collector layer" and the "negative electrode current collector layer" in the present disclosure.

Restraint of the Laminated Battery

The laminated battery of the present disclosure may be constrained in the stacking direction in use. According to this configuration, the conductivity of ions and electrons in the interior of each layer of the battery stack and between the layers is improved during charging and discharging, and the battery reaction can be further promoted.

The binding force in this case is not particularly limited. The binding force may be, for example, 1.0 MPa or more, 1.5 MPa or more, 2.0 MPa or more, or 2.5 MPa or more. The upper limit of the binding force is not particularly limited. The maximum binding power may be below 50 MPa, below 30 MPa, below 10 MPa, or below 5 MPa.

Example 1

Preparation of Positive Electrode Active Material Layer

To a polypropylene (PP) container was added a polyvinylidene fluoride (PVDF)-based binder (manufactured by Kreha Co., Ltd.), a positive electrode active material, a sulfide solid electrolyte ($Li_2S$—$P_2S_5$-based glass ceramics), a conductive auxiliary agent (vapor-grown carbon fiber (VGCF), manufactured by Showa Denko Co., Ltd.), and solvents. The resulting mixtures were stirred for 30 seconds in an ultrasonic disperser (UH-50 from SMT). The resulting mix was then shaken in a polypropylene container with a shaker (Shibata Scientific TTM-1) for 3 minutes and further stirred in an ultrasonic disperser for 30 seconds. Then, a coating liquid was obtained.

The coating liquid obtained was coated on a SUS foil by a blade method using an applicator. The coated coating liquid was dried on a hot plate at 100° C. for 30 minutes after natural drying. Then, a transfer material for a positive electrode active material layer having a positive electrode active material layer on one surface of a stainless steel foil was obtained.

Preparation of Negative Electrode Active Material Layer

A polyvinylidene fluoride-based binder (manufactured by Kreha Co., Ltd.), a negative electrode active material (lithium titanate (LTO)), the above-mentioned sulfide solid electrolyte, and solvents were added to the propylene-made container. The resulting mixtures were stirred for 30 seconds in an ultrasonic disperser (UH-50 from SMT). Then, a coating liquid was obtained.

The coating liquid thus obtained was coated on a stainless steel foil by a blade method using an applicator. The coated coating liquid was dried on a hot plate at 100° C. for 30 minutes after natural drying. Then, a negative electrode active material layer was obtained on one surface of the stainless steel foil.

Preparation of Solid Electrolyte Layer

To the propylene vessel was added butyl butyrate and the sulfide solid electrolyte. The added butyl butyrate and the above-mentioned sulfide solid electrolyte were stirred in an ultrasonic dispersing device (UH-50 manufactured by SMT) for 30 seconds. The resulting mix was then shaken in a polypropylene vessel (Shibata Scientific TTM-1) for 30 minutes and further stirred in an ultrasonic disperser for 30 seconds. Then, a coating liquid was obtained.

The coating liquid thus obtained was coated on a stainless steel foil by a blade method using an applicator. The coated coating liquid was dried on a hot plate at 100° C. for 30 minutes after natural drying. Then, a transfer material for a solid electrolyte layer having a solid electrolyte layer on one surface of a stainless steel foil was obtained.

Preparation of Resin Current Collector

A coating of a fluorine-based resin was applied on the conductive resin layer using a doctor blade having a coating gap of 50 μm. Then, a resin current collector of the fluorine-based resin layer/conductive resin layer was obtained.

Preparation of Sulfide Solid Laminated Battery for Evaluation

The transfer material for the solid electrolyte layer was disposed on the negative electrode active material layer on the surface of the stainless steel foil and pressed. The stainless steel foil of the transfer material for the solid electrolyte layer was peeled off. As a result, a laminate of the solid electrolyte layer/the negative electrode active material layer/the stainless steel foil was obtained. The obtained laminate was punched so as to have a size larger than that of the positive electrode active material layer obtained above.

Next, the transfer material for the positive electrode active material layer was disposed on the solid electrolyte layer of the laminate of the solid electrolyte layer/negative electrode active material layer/stainless steel foil obtained above, and pressed. Then, both surfaces of the stainless steel foil were peeled off. As a result, a laminate having a structure of a positive electrode active material layer, a solid electrolyte layer, and a negative electrode active material layer was obtained.

Next, a conductive resin layer was bonded to both surfaces of the laminated body of the obtained positive electrode active material layer/solid electrolyte layer/negative electrode active material layer to obtain a sulfide solid laminated battery of Example 1 having a structure of a resin current collector/positive electrode active material layer/solid electrolyte layer/negative electrode active material layer/resin current collector. Here, the resin current collector is disposed such that the conductive resin layer of the resin current collector is in contact with the positive electrode active material layer and the negative electrode active material layer, and the fluorine-based resin layer of the resin current collector faces the side opposite to the positive electrode active material layer and the negative electrode active material layer. Therefore, the sulfide solid laminated battery of Example 1 had a laminated structure of a fluorine-based resin layer, a conductive resin layer, a positive electrode active material layer, a solid electrolyte layer, a negative electrode active material layer, a conductive resin layer, and a fluorine-based resin layer.

The obtained sulfide solid-state laminated battery of Example 1 was used as the evaluation battery of Example 1. All operations up to this point were performed in the dry room environment.

Comparative Example 1

The evaluation battery of Comparative Example 1 was obtained in the same manner as in Example 1, except that a single conductive resin layer having no fluorine-based resin layer was used as the resin current collector.

Evaluation

Cycle Characteristics of Laminated Battery

For the evaluation batteries of Example 1 and Comparative Example 1, cycle evaluation was measured in the atmosphere. Constant-current constant-voltage charging and discharging were carried out at 25° C. and 0.33 C within 1.5 to 3.0 V.

Figure 4:
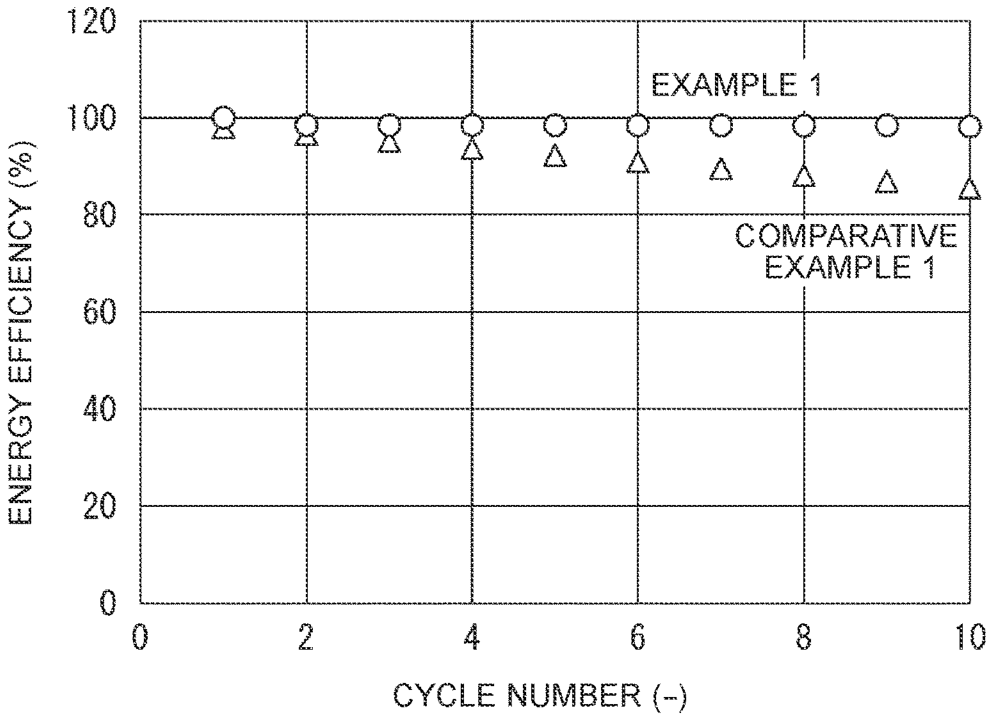
FIG. 4 is a graph showing the relation between the number of cycles and the charge/discharge efficiency of the sulfide solid-state laminated batteries of Example 1 and Comparative Example 1.

FIG. 4 shows a change in charge/discharge efficiency with an increase in the number of cycles in which the charge/discharge efficiency in the first cycle is set to 100%. As is apparent from FIG. 4, the sulfide solid laminated battery of Example 1 having the fluorine-based resin layer on the conductive resin layer on both surfaces had cycle characteristics as compared with the sulfide solid laminated battery of Comparative Example 1 having no fluorine-based resin layer.

Evaluation of Gas Barrier Properties

The gas barrier properties of the resin current collector used in Example 1, that is, the resin current collector having the laminated structure of the fluorine-based resin layer and the conductive resin layer, and the resin current collector used in Comparative Example 1, that is, the single conductive resin layer were evaluated.

Specifically, a water vapor permeation test was performed as described below to evaluate gas barrier properties.

Test methods: Compliant with JISK7129-4 (differential pressure method)

Detector: Gas Chromatograph

Test gas: Water vapor (humidified atmosphere)

Temperature and humidity: 40±2° C., 90±5% (relative humidity)

Differential pressure: 1 atm

Figure 5:
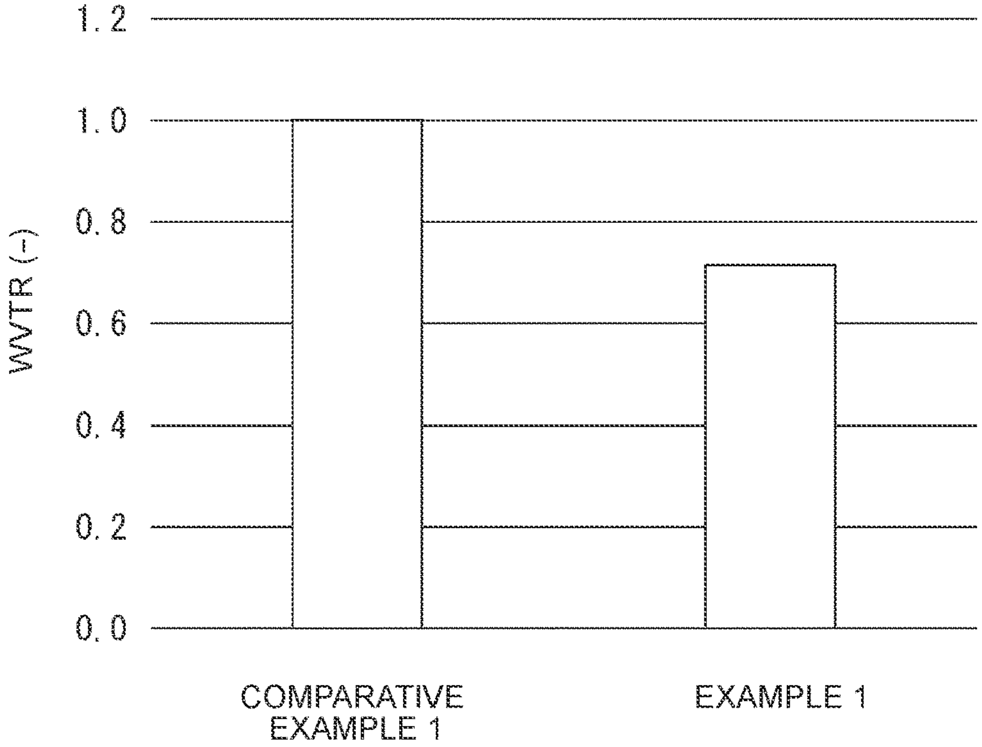
FIG. 5 is a graph showing evaluation results of water vapor permeability of a resin current collector to be used in Example 1 and Comparative Example 1.

In the case of the resin current collector comprising only the conductive resin layer (Comparative Example 1) as a reference (1.0), the evaluation result is shown in FIG. 5. As is clear from FIG. 5, the resin current collector (Example 1) comprising the fluorine-based resin layer and the inorganic coating layer had superior protection against water vapor permeation, that is, gas barrier properties, as compared with the case of the resin current collector comprising only the conductive resin layer (Comparative Example 1).

What is claimed is:

1. A resin current collector comprising:

a conductive resin layer containing a base material resin and a conductive filler dispersed in the base material resin; and a fluorine-based resin layer laminated on the conductive resin layer, the fluorine-based resin layer including more than 50% by mass of fluorine-based resin.

2. A laminated battery comprising one or more unit batteries, wherein:

a resin current collector is provided as an end surface of the laminated battery, the resin current collector comprising:

a conductive resin layer containing a base material resin and a conductive filler dispersed in the base material resin; and a fluorine-based resin layer laminated on the conductive resin layer; and wherein the conductive resin layer of the resin current collector is in contact with another layer of one of the one or more unit batteries constituting the laminated battery, and the fluorine-based resin layer of the resin current collector is disposed so as to face opposite to the another layer of the one of the one or more unit batteries constituting the laminated battery.

3. The laminated battery according to claim 2, wherein at least one of a positive electrode layer, a solid electrolyte layer, a negative electrode layer constituting the unit battery contains a sulfide solid electrolyte.

4. The laminated battery according to claim 2, wherein the fluorine-based resin layer includes 60% by mass or more of fluorine-based resin.

5. The laminated battery according to claim 2, wherein the fluorine-based resin layer includes 70% by mass or more of fluorine-based resin.

6. The laminated battery according to claim 2, wherein the fluorine-based resin layer includes 80% by mass or more of fluorine-based resin.

7. The laminated battery according to claim 2, wherein the fluorine-based resin layer includes 90% by mass or more of fluorine-based resin.

8. The laminated battery according to claim 2, wherein the fluorine-based resin layer includes 99% by mass or more of fluorine-based resin.

9. The resin current collector according to claim 1, wherein the fluorine-based resin layer includes 60% by mass or more of fluorine-based resin.

10. The resin current collector according to claim 1, wherein the fluorine-based resin layer includes 70% by mass or more of fluorine-based resin.

11. The resin current collector according to claim 1, wherein the fluorine-based resin layer includes 80% by mass or more of fluorine-based resin.

12. The resin current collector according to claim 1, wherein the fluorine-based resin layer includes 90% by mass or more of fluorine-based resin.

13. The resin current collector according to claim 1, wherein the fluorine-based resin layer includes 99% by mass or more of fluorine-based resin.

14. A laminated battery comprising:

a unit battery having of a positive electrode layer, a solid electrolyte layer, and a negative electrode layer;

a conductive resin layer containing a base material resin and a conductive filler dispersed in the base material resin, the conductive resin layer in contact with the positive electrode layer or the negative electrode layer; and a fluorine-based resin layer laminated on the conductive resin layer opposite the positive electrode layer or the negative electrode layer in contact with the conductive resin layer.

15. The laminated battery according to claim 14, wherein the fluorine-based resin layer includes 60% by mass or more of fluorine-based resin.

16. The laminated battery according to claim 14, wherein the fluorine-based resin layer includes 70% by mass or more of fluorine-based resin.

17. The laminated battery according to claim 14, wherein the fluorine-based resin layer includes 80% by mass or more of fluorine-based resin.

18. The laminated battery according to claim 15, wherein the fluorine-based resin layer includes 90% by mass or more of fluorine-based resin.

19. The laminated battery according to claim 14, wherein the fluorine-based resin layer includes 99% by mass or more of fluorine-based resin.

* * * * *